(12) United States Patent
Astanovsky et al.

(10) Patent No.: US 8,306,579 B2
(45) Date of Patent: Nov. 6, 2012

(54) VEHICULAR ADAPTER APPARATUS

(75) Inventors: Michael Astanovsky, Hadera (IL); Leonid Goldberg, Ashdod (IL); Eli Margalit, Ra'Anana (IL); Yaakov Moseri, Shoham (IL)

(73) Assignee: Motorola Solutions, Inc., Schaumburg, IL (US)

( * ) Notice: Subject to any disclaimer, the term of this patent is extended or adjusted under 35 U.S.C. 154(b) by 527 days.

(21) Appl. No.: 12/511,700

(22) Filed: Jul. 29, 2009

(65) Prior Publication Data

US 2011/0028105 A1    Feb. 3, 2011

(51) Int. Cl.
*H04M 1/00* (2006.01)
(52) U.S. Cl. ............... 455/569.2; 455/575.9; 455/573; 379/446; 379/455
(58) Field of Classification Search ............ 455/569.1, 455/569.2, 572, 573, 575.9; 379/420.04, 379/426, 428.04, 455; D14/251, 253
See application file for complete search history.

(56) References Cited

U.S. PATENT DOCUMENTS

| | | | |
|---|---|---|---|
| 5,438,685 A | | 8/1995 | Sorensen et al. |
| 5,659,887 A | * | 8/1997 | Ooe ............ 455/575.9 |
| 5,995,622 A | * | 11/1999 | Roussy et al. ........... 379/446 |
| 6,019,624 A | | 2/2000 | Garcia |
| 6,138,041 A | * | 10/2000 | Yahia ............ 455/569.2 |
| 6,208,734 B1 | * | 3/2001 | Ortscheid et al. ............ 379/446 |
| 6,339,699 B1 | * | 1/2002 | Hirai et al. ............ 455/575.1 |
| 6,341,218 B1 | * | 1/2002 | Poplawsky et al. ........ 455/569.1 |
| 6,785,567 B2 | | 8/2004 | Kato |
| 7,062,300 B1 | * | 6/2006 | Kim ............ 455/569.1 |
| 7,801,572 B2 | * | 9/2010 | Bury ............ 455/569.1 |
| 7,818,034 B2 | * | 10/2010 | Richards ............ 455/575.1 |
| 8,078,237 B2 | * | 12/2011 | Bury ............ 455/575.1 |
| 2004/0132343 A1 | * | 7/2004 | Bisplinghoff ............ 439/638 |

OTHER PUBLICATIONS

International Search Report & Written Opinion for International Application No. PCT/US2010/039578 mailed on Feb. 17, 2011.
English language Abstract of Japanese Patent No. 11-040252 A, Japanese Patent Office, Patent & Utility Model Gazette, Patent Abstracts of Japan, (1999).
English language Abstract of Japanese Patent No. 02-101796 A, Japanese Patent Office, Patent & Utility Model Gazette, Patent Abstracts of Japan, (1990).

* cited by examiner

*Primary Examiner* — Duc M Nguyen
(74) *Attorney, Agent, or Firm* — Barbara R. Doutre (57) ABSTRACT

A vehicular adapter (100) provides an interface to accommodate a variety of contacts located on different surfaces of a portable radio (200). The vehicular adapter includes a rotating pocket (116), pivot arms (136, 150, 152) and a locking mechanism (126). The rotating pocket (116) provides a first set of contacts (124). One pivot arm (136) provides an antenna probe (120) on one surface of the vehicular adapter while another pivot arm (152) provides connector side contacts (122) to a side surface of the vehicular adapter. The pivot arms (136, 150, 152) pivot in response to the rotating pocket (116) being rotated thereby moving their respective contacts into position for mating with the portable radio (200).

18 Claims, 10 Drawing Sheets

VEHICULAR ADAPTER APPARATUS

FIELD OF THE DISCLOSURE

The present disclosure relates generally to vehicular adapters for portable radios, and more particularly to the mechanical interface and electrical coupling between a vehicular adapter and a portable radio.

BACKGROUND

Portable radios are often used in conjunction with vehicular adapters in order to facilitate hands free communications as well as provide charging capability to the portable radio within an automotive environment.

The main difficulties associated with vehicular adapter design are the mechanical engagement and disengagement and the electrical connectivity to the portable device. For portable radio devices having more than one connector located on different sides of the device, the mechanical interface and the electrical coupling to the vehicular adapter become even more difficult. The engagement and disengagement of the portable radio device having multiple contacts located on different sides typically requires several operations to engage and disengage the portable device to and from the vehicular adapter. Additionally, the portable radio must be fully operational under a variety of vehicular environments including vibration, shock, and even certain collision conditions. The ease of manufacturing, cost and ease of use for the end user need to be taken into account in the design of a vehicular adapter.

Past vehicular adapters have been configured such that the portable radio is inserted in one direction or in one manner. The user interface is therefore the same for all vehicles and for all users which may not be optimal under all conditions. Additionally, as the number of interface contacts increase on the portable radio device so does the number and complexity of the interconnect mechanisms on the vermicular adapter. Multiple contacts on a portable radio typically require several operations or steps to engage the radio into the adapter.

Accordingly, there is a need for an improved mechanism for engaging and disengaging a portable radio to and from a vehicular adapter and maintaining a reliable electrical interface.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and apparatus components related to a vehicular adapter's engagement and disengagement and electrical coupling of a portable radio. The vehicular adapter provided herein allows insertion of a portable radio into the vehicular adapter while engaging connectors from different sides using a single step operation. Briefly, a rotating pocket, three pivot arms and a locking mechanism are provided to accomplish this task. The rotating pocket provides a first set of contacts. One pivot arm provides an antenna probe on one surface of the vehicular adapter while another pivot arm provides connector side contacts to a side surface of the vehicular adapter. The pivot arms pivot in response to the rotating pocket being rotated thereby moving their respective contacts into position for mating with the portable radio.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
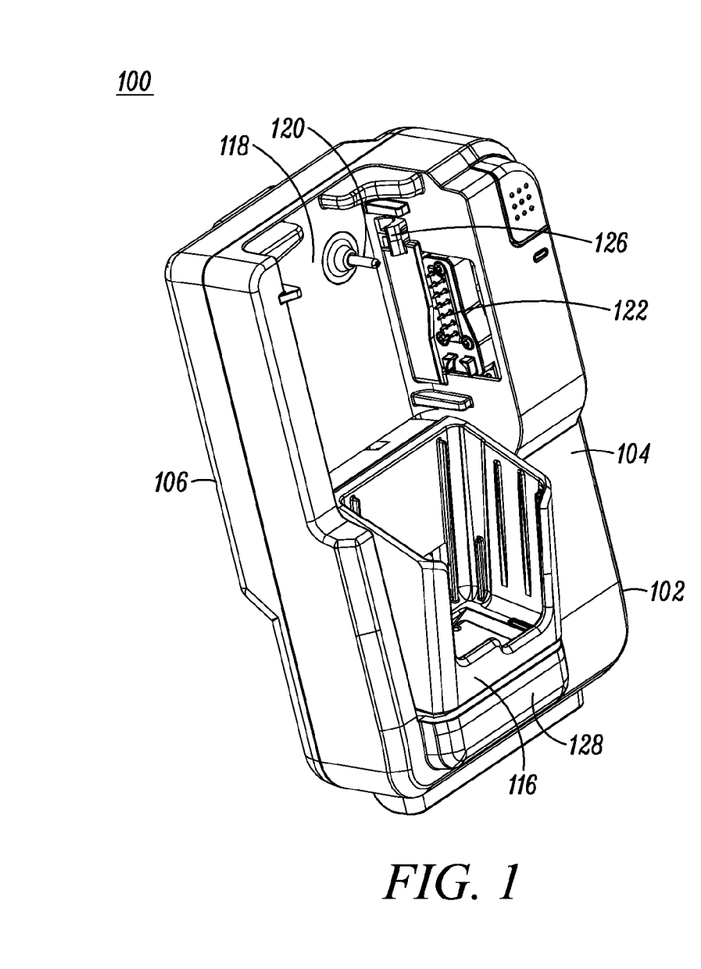
FIG. 1 is a vehicular adapter in accordance with an embodiment of the invention.
Figure 2:
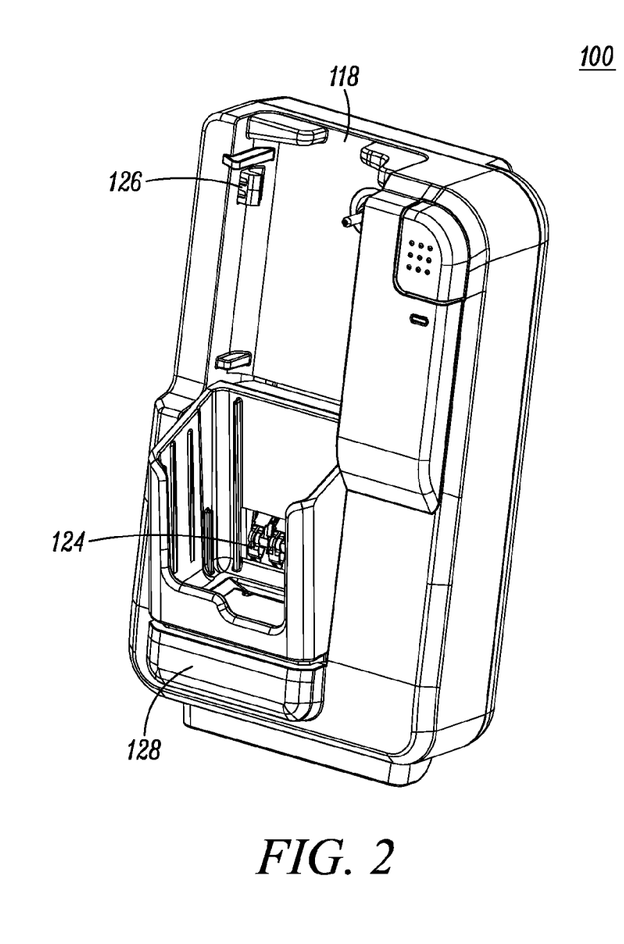
FIG. 2 is another view of the vehicular adapter of FIG. 1 in accordance with an embodiment of the invention.

FIGS. 1 and 2 illustrate a vehicular adapter 100 formed in accordance with an embodiment of the invention. Vehicular adapter 100 comprises a housing 102 having a front housing portion 104 and a back housing portion 106. The front housing portion 104 contains electronics, electronic interface and a mounting interface for a portable radio (shown later) while the back housing portion 106 provides a mounting mechanism to mount the vehicular adapter 100 within a vehicle. In accordance with the various embodiments of the invention, the electronic interface and mounting interface for the portable radio are described herein.

The front housing portion 104 comprises a recessed area 118 which provides a cradle within which to receive a rotating pocket 116 having a portable radio inserted therein (the radio to be shown later). The rotating pocket 116 rotates away from and towards the housing 102 within a basin portion 128 seated within the recessed area 118. In accordance with the various embodiments to be described herein, the vehicular adapter 100 provides a plurality of contacts having different form factors and located on different surfaces for mating with corresponding contacts of the portable radio.

As seen in FIGS. 1 and 2, an antenna probe 120 is located on a surface within the recessed area 118. The antenna probe 120 is formed as a telescopic structure that can be moved inward and outward in conjunction with movement of the rotating pocket 116. When the rotating pocket 116 is pushed towards the recessed area 118 of front housing portion 104, the antenna probe retracts outward. When the rotating pocket is rotated away from the front housing portion 104, the antenna probe is retracted inward (either fully or partially), thereby protecting the antenna probe.

Side connector contacts 122, such as a plurality of pogo pin contacts, are located on another surface (side surface) of the recessed area 118. Other side connector contacts, such as pogo pins, or other spring contacts may also be used in place of pogo pins contacts. The side connector contacts 122 project through and retract into an opening in the recessed area 118. Power contacts 124, such as cantilever contacts or other suitable contacts for power, are located within the rotating pocket 116. As an alternative embodiment discussed later, another set of side connector contacts may be implemented on the opposite side of side connector contacts 122. The power contacts 124 are shown on a side surface of the rotating pocket 116 but could also be located on a bottom surface depending on the configuration of the portable radio to be inserted therein.

First and second latches 126, provided as part of a locking mechanism to be described later, extend from the side surfaces the recessed area 118. The latches 126 are used for captivating the portable radio in response to the rotating pocket 116 being rotated towards the front housing portion 104 within recessed area 118 of the vehicular adapter 100.

The vehicular adapter 100 shown in FIGS. 1 and 2 thus provides for antenna probe 120, side connector contacts 122, power contacts 124 within rotating pocket 116, and latches 126—all located on various surfaces. Hence, vehicular adapter 100 provides different types of contacts located on different surfaces.

Figure 3:
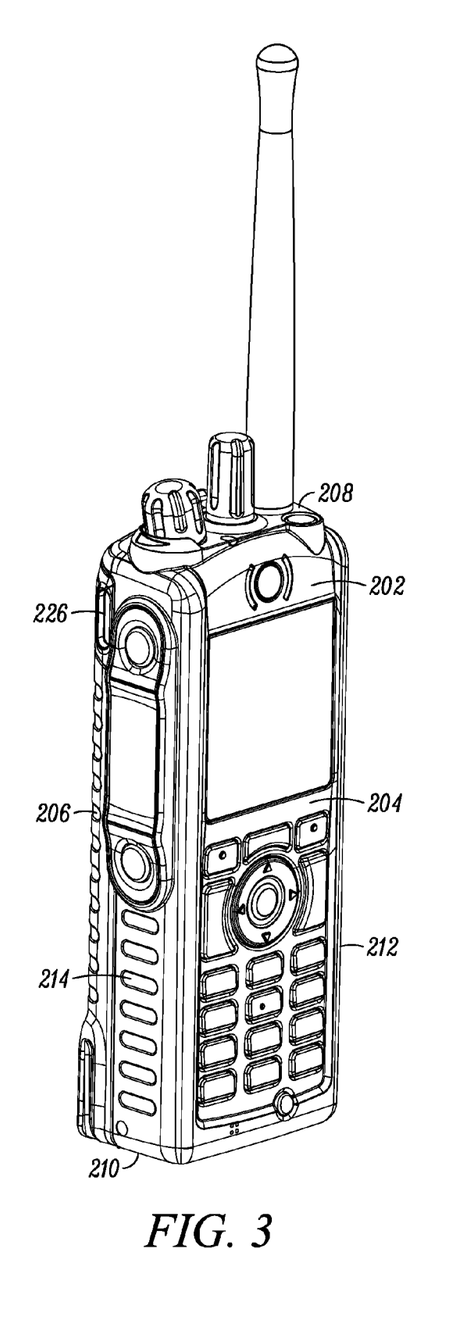
FIGS. 3 and 4 show the portable radio and its various contact surfaces for use in the vehicular adapter in accordance with an embodiment of the invention.
Figure 4:
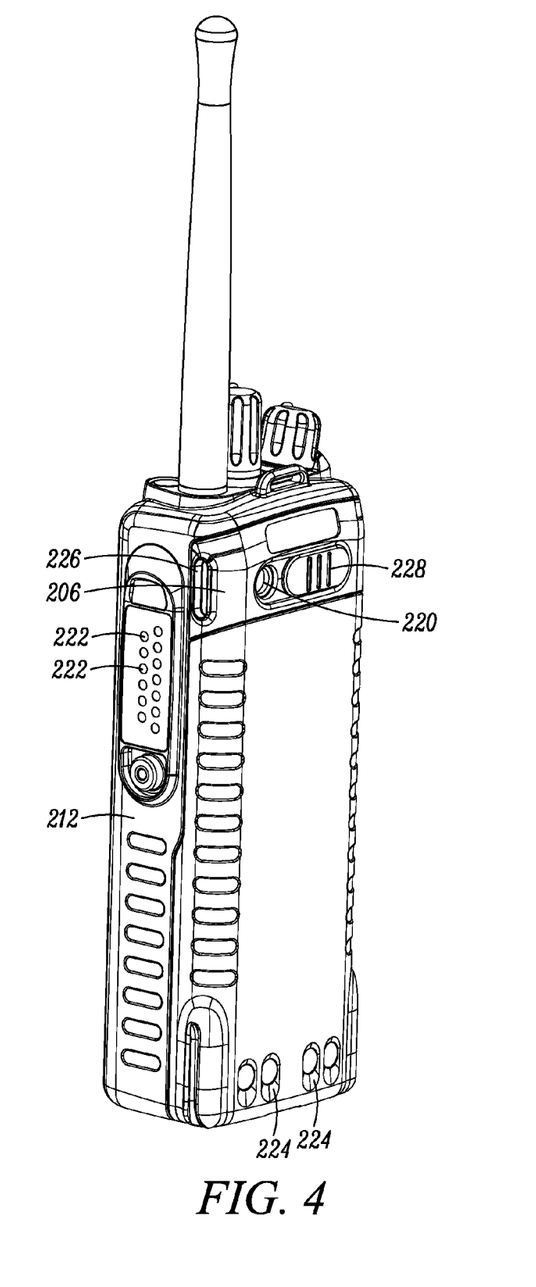

FIGS. 3 and 4 illustrate a portable radio 200 having a plurality of contact surfaces with various contact types for use with the vehicular adapter 100 formed in accordance with an embodiment of the invention. Portable radio 200 is formed of radio housing 202 having front 204, back 206, top 208, bottom 210 and first and second side surfaces 212, 214 respectively. The back surface 206 includes a recessed antenna contact 220, such as a recessed antenna switch or other antenna interface. The recessed antenna switch contact may have a protective cover 228, such as a sliding door or other covering means to provide additional protection when the radio 200 is not being used in conjunction with the vehicular adapter 100. A user closes the protective cover 228 located on the back of the radio when the radio is removed from the vehicular adapter 100. Prior to insertion into the vehicular adapter 100, the user opens the protective cover 228. Radio side contacts 222, such as contacts used for the radio's microcontroller, are located on first side surface 212. Radio power contacts 224 are located on back surface 206. First and second slots 226 are formed on the side surfaces 212, 214 for locking the radio into recessed area 118.

Referring to FIGS. 1, 2, 3 and 4, the antenna probe 120 of vehicular adapter 100 is provided for making contact to the recessed antenna contact 220. The side connector contacts 122 located on the side surface of the recessed area 118 are provided for mating with the radio side contacts 222. The power contacts 124 located within the rotating pocket 116 are provided to mate with the portable radio's power contacts 224. The latches 126 of the vehicular adapter 100 are provided for captivating the first and second slots 226 of the portable radio 200.

Figure 5:
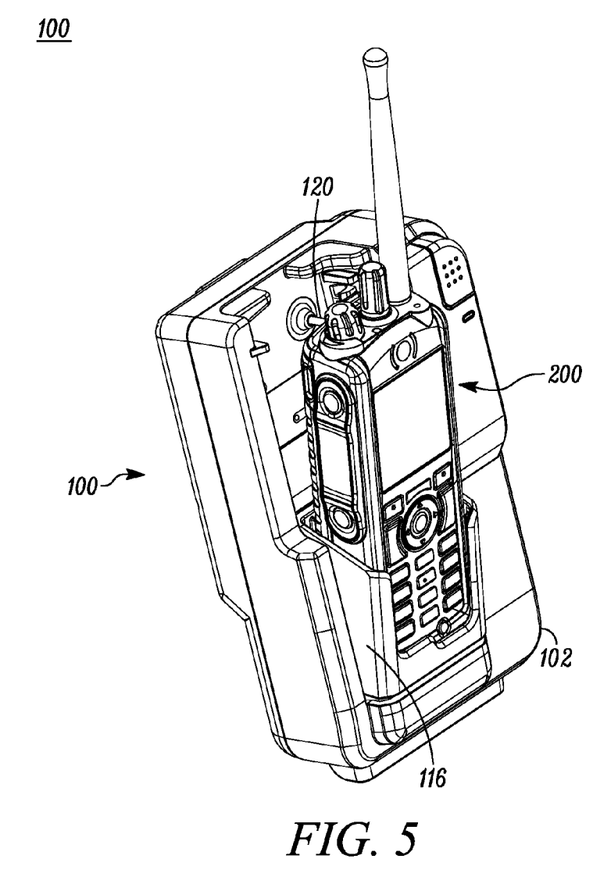
FIG. 5 is the vehicular adapter with a portable radio partially engaged/disengaged in accordance with an embodiment of the invention.
Figure 6:
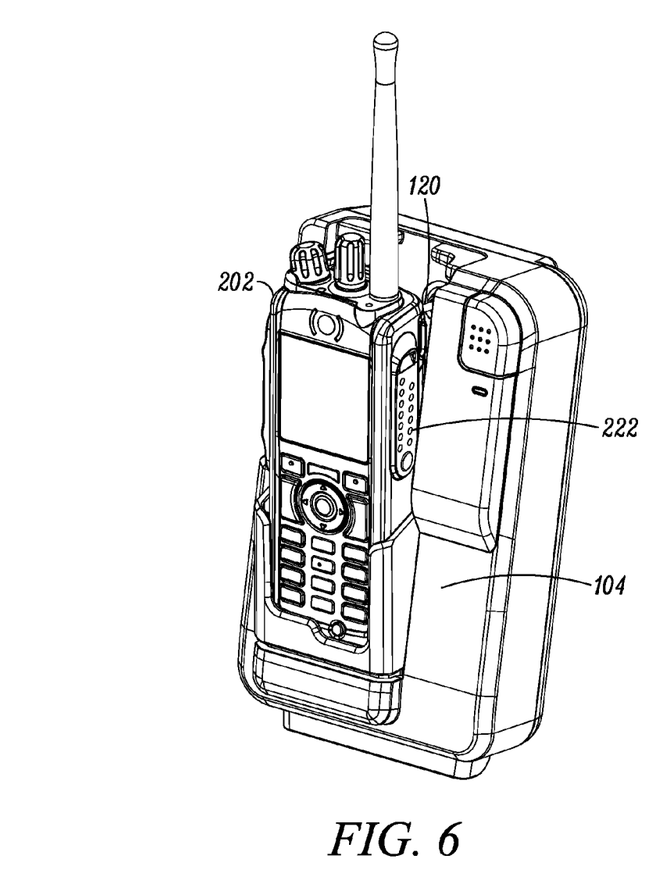
FIG. 6 is another view of the vehicular adapter with the portable radio partially engaged/disengaged in accordance with an embodiment of the invention.

Referring to FIGS. 5 and 6, vehicular adapter 100 is shown with rotating pocket 116 rotated away from the front housing portion 104 with portable radio 200 inserted therein. At this stage, the portable radio's power contacts 224 mate with corresponding vehicular adapter's power contacts 124 located within the rotating pocket 116. If the vehicular adapter power contacts 124 are embodied as cantilever contacts, the flat radio power contacts would align and mate upon insertion of the portable radio 200 within the rotating pocket 116.

As the rotating pocket 116 is rotated into recessed area 118, the antenna probe 120 extends outward, aligns with and inserts within recessed antenna contact 220 of the portable radio 200. The telescoping nature of the antenna probe 120 also allows the probe to be pushed backward thereby providing a reliable connection within the recessed antenna contact 220 without damaging the probe. The telescoping nature of the antenna probe 120 also allows for retraction of the probe into the front housing portion 104 when the rotating pocket is rotated away from the housing, for removal of the radio. Additionally, if radio 200 is inserted within the rotating pocket 116 and pushed towards the recessed area 118 with the protective door 228 covering the recessed antenna contact 220, the telescopic nature of antenna probe 120 provides for retraction of the probe into the front housing portion 104 thereby protecting the antenna probe 120 from damage.

Figure 7:
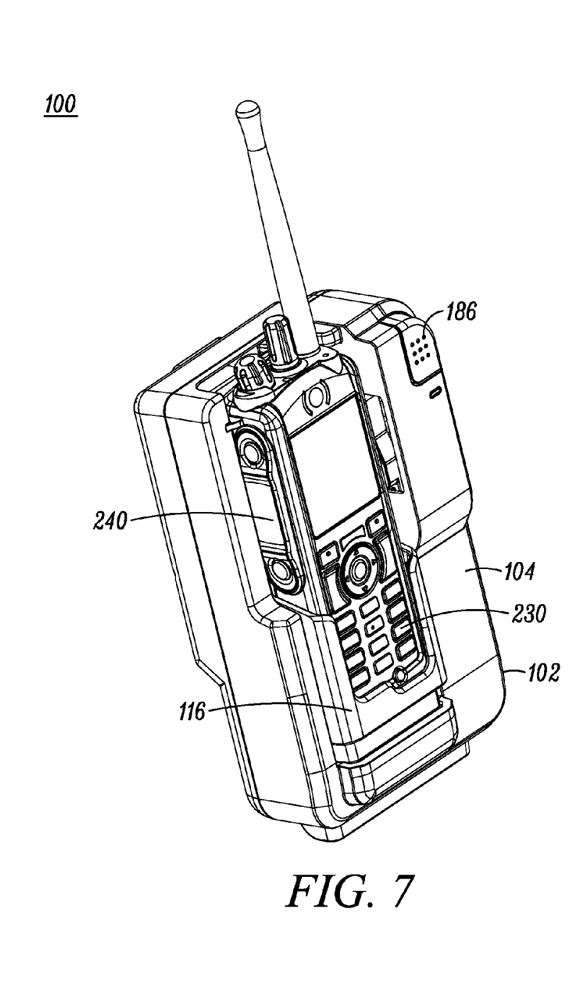
FIG. 7 is the vehicular adapter with the portable radio fully engaged therein in accordance with an embodiment of the invention.
Figure 8:
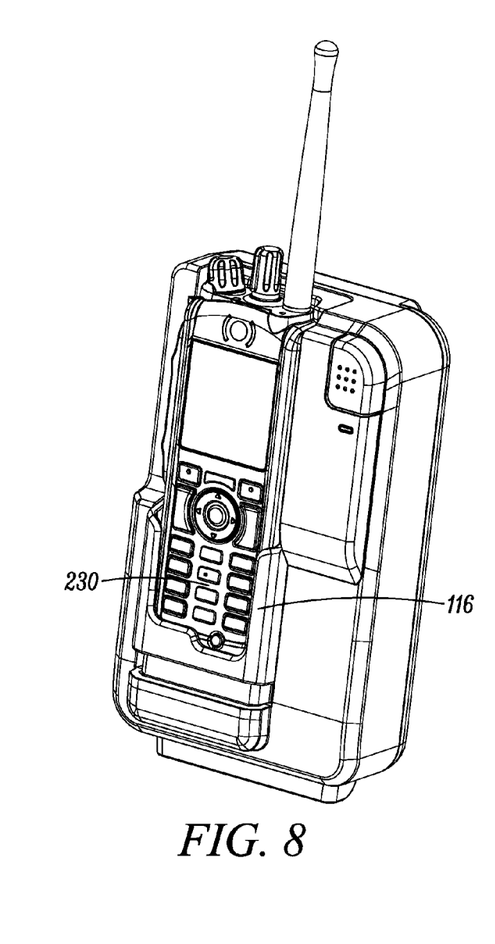
FIG. 8 is another view of the vehicular adapter with the portable radio fully engaged therein in accordance with an embodiment of the invention.

FIGS. 7 and 8 illustrate two views of the vehicular adapter 100 with the rotating pocket 116 with portable radio 200 inserted therein rotated into the recessed area 118 of the housing 102. The rotating pocket 116 is formed such that functional features of the radio, such as a keypad 230 and push-to-talk switch PTT 240 are still easily accessible by the user. The rotation of the rotating pocket 116 into recessed area 118 causes the antenna probe 120 to couple to the portable radio's corresponding recessed antenna contact 220, and the vehicular adapter's side connector contacts 122 to couple to the corresponding radio side contacts 222. Latches 126 are latched into the portable radio's slots 226 for captivating the radio within the vehicular adapter 100.

In an alternative embodiment, two sets of side connector contacts 122 may be used to adapt to corresponding contacts located on either side of the portable radio 200. This embodiment will be discussed later, but briefly, the PTT switch 240 may be located elsewhere on the portable radio 200, such as on the front 204 of the radio or the top 208 of the radio, or the PTT switch 240 may even be covered when the radio is recessed within the recessed area 118. The PTT functionality may be directed to a remote microphone or separate switch on the vehicular adapter housing 102 while the area originally denoted for PTT switch 240 may comprise another series of side contacts providing additional radio interconnects. In this alternative embodiment, the recessed area 118 would accommodate another series of connector contacts, such as pogo pins or the like, opposite to those denoted by side connector contacts 122. Basically, the vehicular adapter can be formed with side contacts on one side of the recessed area 118 or the vehicular adapter can be formed with side contacts on two side walls of the recessed area depending on the number of interconnects needed for the portable radio.

Each of the interconnect sub-assemblies of the vehicular adapter 100 will now be discussed.

Rotating Pocket and Antenna Probe.

Figure 9:
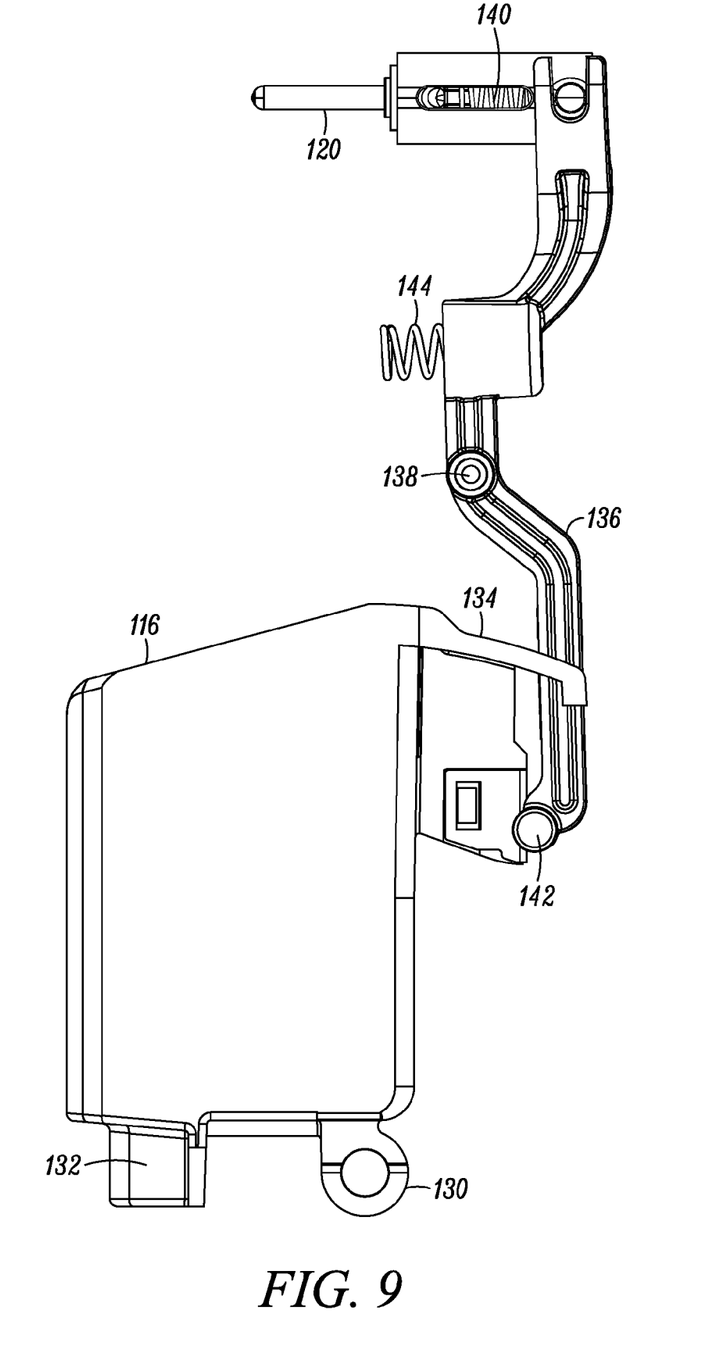
FIG. 9 is a side view of the antenna probe, probe arm and pocket in accordance with an embodiment of the invention.
Figure 10:
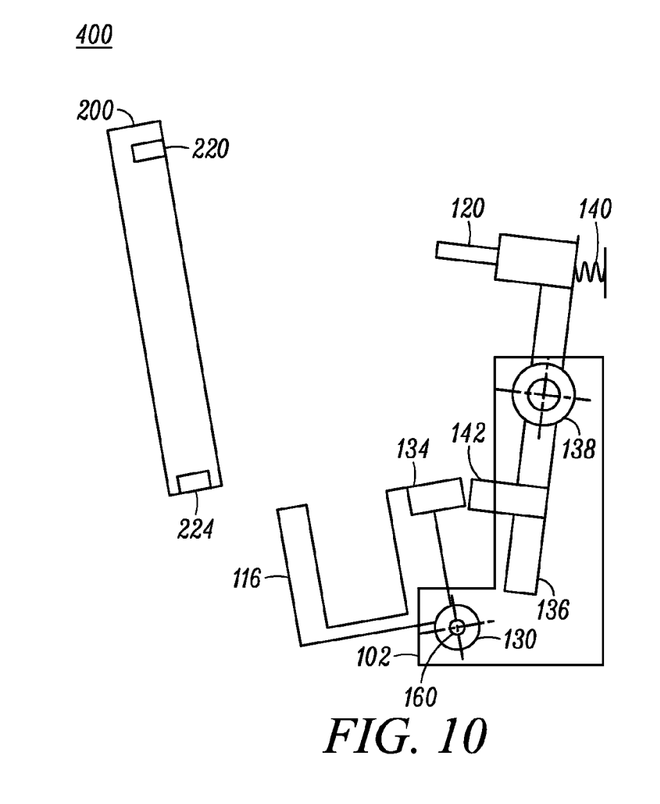
FIGS. 10 and 11 provide block diagrams outlining the interoperability of the components of FIG. 9.
Figure 11:
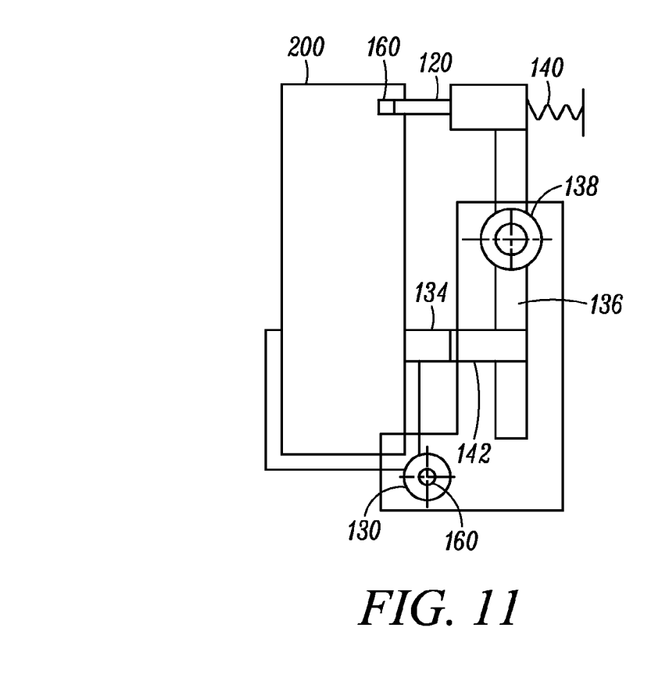

FIGS. 9, 10 and 11 provide more detailed views of the interconnection between the rotating pocket 116 and antenna probe 120. FIG. 9 shows a side view of rotating pocket 116 and antenna probe 120. The rotation of the rotating pocket 116 is provided by pocket hinge 130 (though which a rod, shown later, is inserted) located along the bottom of the rotating pocket. A footer 132 is located on the bottom of the rotating pocket 116 to limit the amount of rotation (within basin portion 128 of FIG. 1) away from the housing 102. A stop plate 134 in the form of a lip or edge is located on the back of rotating pocket 116. The stop plate 134 limits the amount of motion of rotating pocket 116 for radio removal. A back pivot arm which will be referred to as antenna probe arm 136 is pivotally coupled within the front housing portion 104 of vehicular adapter 100. The antenna probe arm 136 includes a back arm hinge 138, a probe spring 140, and a front stop 142. The front stop 142 is a projection (such as a cylindrical surface) located towards the lower end of antenna probe arm 136. The front stop 142 comes into contact with at least a portion of the pocket's stop plate 134 when the pocket is rotated into the vehicular adapter (as seen in FIG. 11). The antenna probe arm 136 is coupled within the front housing portion 104 via back arm hinge 138. An arm spring 144 provides spring loading to antenna probe arm 136 above the hinge 138. Arm spring 144 is compressed in response to the rotating pocket 116 being rotated towards the recessed area 118, causing antenna probe arm 136 to pivot towards the portable radio, which in turn causes the antenna probe move out. Arm spring 144 is released when rotating pocket 116 is rotated out of the recessed area 118 and the antenna probe arm 136 moves backward thereby moving the antenna probe 120 inward. The spring loading of antenna probe 120 via probe spring 140 provides the appropriate force between the portable radio's recessed antenna contact 220 and the vehicular adapter's antenna probe 120.

FIGS. 10 and 11 provide block diagrams outlining the interoperability of the components of FIG. 9. The bottom portion of the antenna probe arm 136 (below the hinge 138) is located behind the rotating pocket 116. The top portion of the antenna probe arm 136 (above hinge 138) includes the antenna probe 120 that engages to the portable device antenna switch 220. Once the bottom portion of the antenna probe arm 136 is moved back, the top portion of the arm moves forward. The antenna probe is activated by pushing the portable radio 200 back into the recessed area 118 of vehicular adapter 100. The rotating pocket 116, within which the portable radio 200 is located, moves back and pushes the bottom portion of antenna probe arm 136 with the antenna probe 120 towards the portable radio's recessed antenna contact 220. The spring loading of antenna probe 120 via probe spring 140 provides the appropriate force between the portable radio's recessed antenna contact 220 and the vehicular adapter's antenna probe 120.

Still referring to FIGS. 10 and 11 in more detail, FIG. 10 shows the rotating pocket 116 is shown rotated away from the housing 102 via the rotating pocket hinge 130. The rotating pocket 116 includes a stop plate 134 formed on the upper back edge of rotating pocket 116. The antenna probe arm 136 is located within the housing 102 and provides antenna probe 120 protruding out of the housing 102 and also provides a front stop 142 protruding out of the housing. Upon insertion of portable radio 200 into rotating pocket 116 and rotation of the rotating pocket 116 towards the front housing portion 104 via pocket hinge 130, the rotating pocket's stop plate 134 pushes onto the front stop 142 of antenna probe arm 136 forcing the antenna probe arm 136 to pivot about back arm pivot point 138 thereby pushing the spring-loaded antenna probe 120 via probe spring 140 into recessed antenna contact 220 of radio 200. As a protection means, it can be noted that if protective door 228 is closed, the antenna probe 120 will not be able to contact the recessed antenna contact 220 and the portable radio 200 will not reach its final position as the side latches 126 will not affix to the portable radio slots 226. The user is able detect this lack of interconnection as the radio returns toward the user via rotating pocket 116. The latches 126 will only latch when the radio is properly seated within the vehicular adapter 100. These protective features avoid damage to the tip of antenna probe 120 of the vehicular adapter and further prevents inadvertent locking of the portable radio 200 when not properly aligned.

Side Rotating Connector Arm(s).

Figure 12:
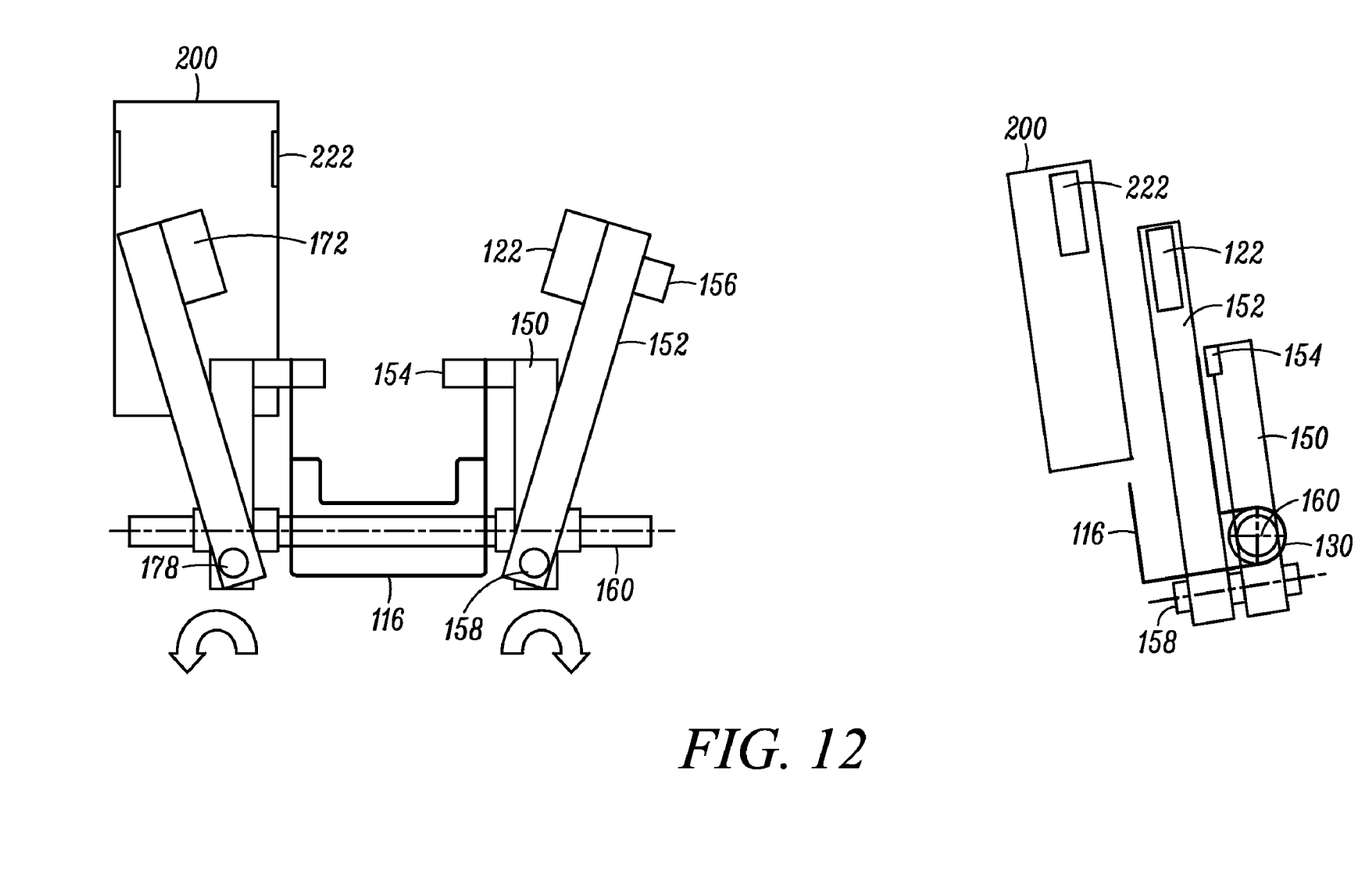
FIGS. 12 and 13 show a block diagram for two arms in accordance with an alternative embodiment
Figure 13:
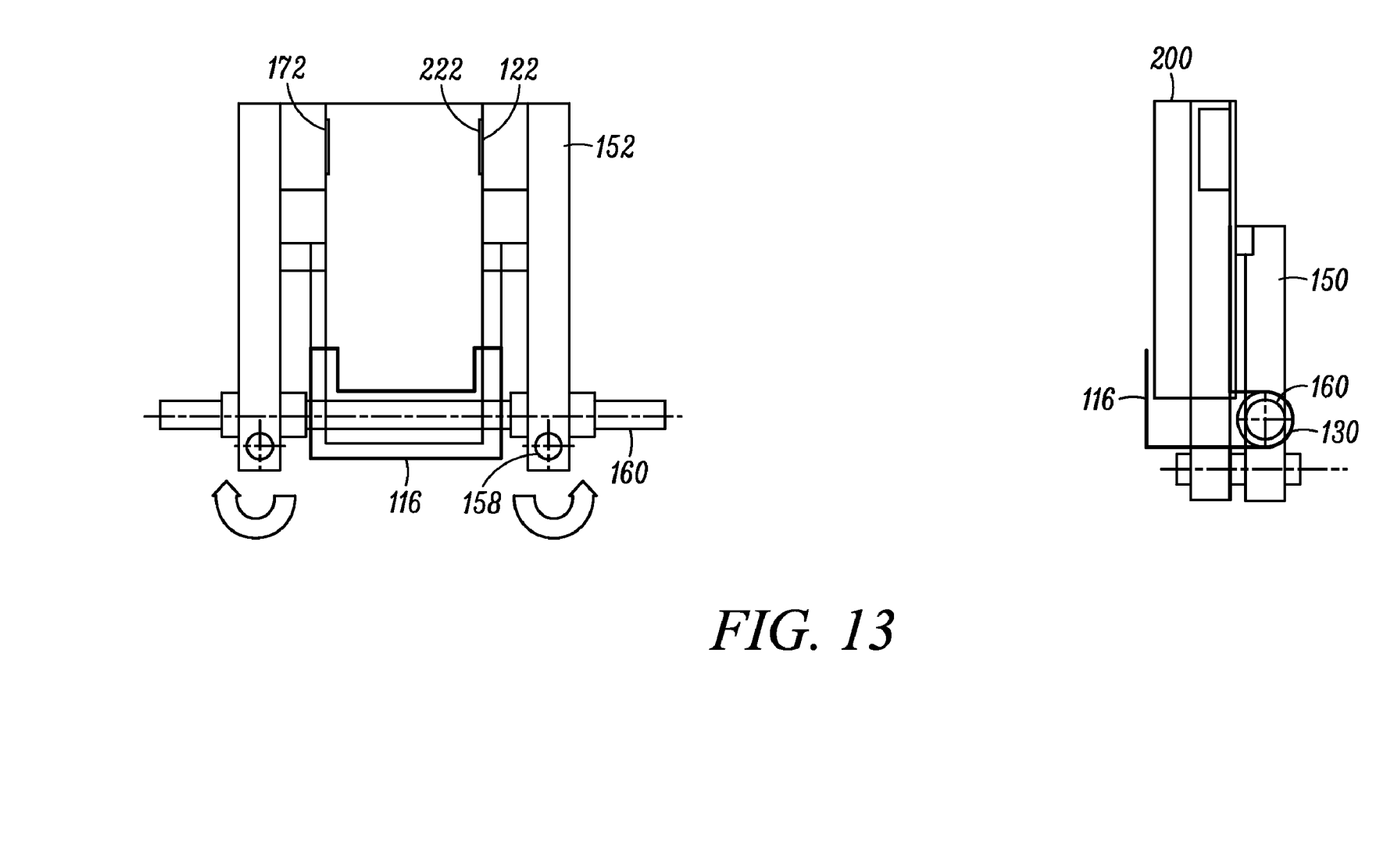

One side connector or two side connectors may be incorporated within the vehicular adapter 100 formed in accordance with the various embodiment of the invention. While FIGS. 1 and 2 show one side connector with side connector contacts 122, the vehicular adapter 100 can be formed to accommodate side connectors on either side of the recessed area 118. FIGS. 12 and 13 show block diagrams representing the two side connector embodiment. As seen in FIG. 12, when no radio is inserted within the vehicular adapter 100, side connectors 122, 172 are pivotally retracted back (within the front housing portion 104) at pivot points 158, 178. As seen in FIG. 13, when the portable radio 200 is inserted into the rotating pocket 116, and the rotating pocket is pushed forward, side connectors 122, 172 are pivotally rotated towards the radio at pivot points 158, 178. Since the operation of both side connectors would be similar (except for opposing directions) only one side is described as follows.

Figure 15:
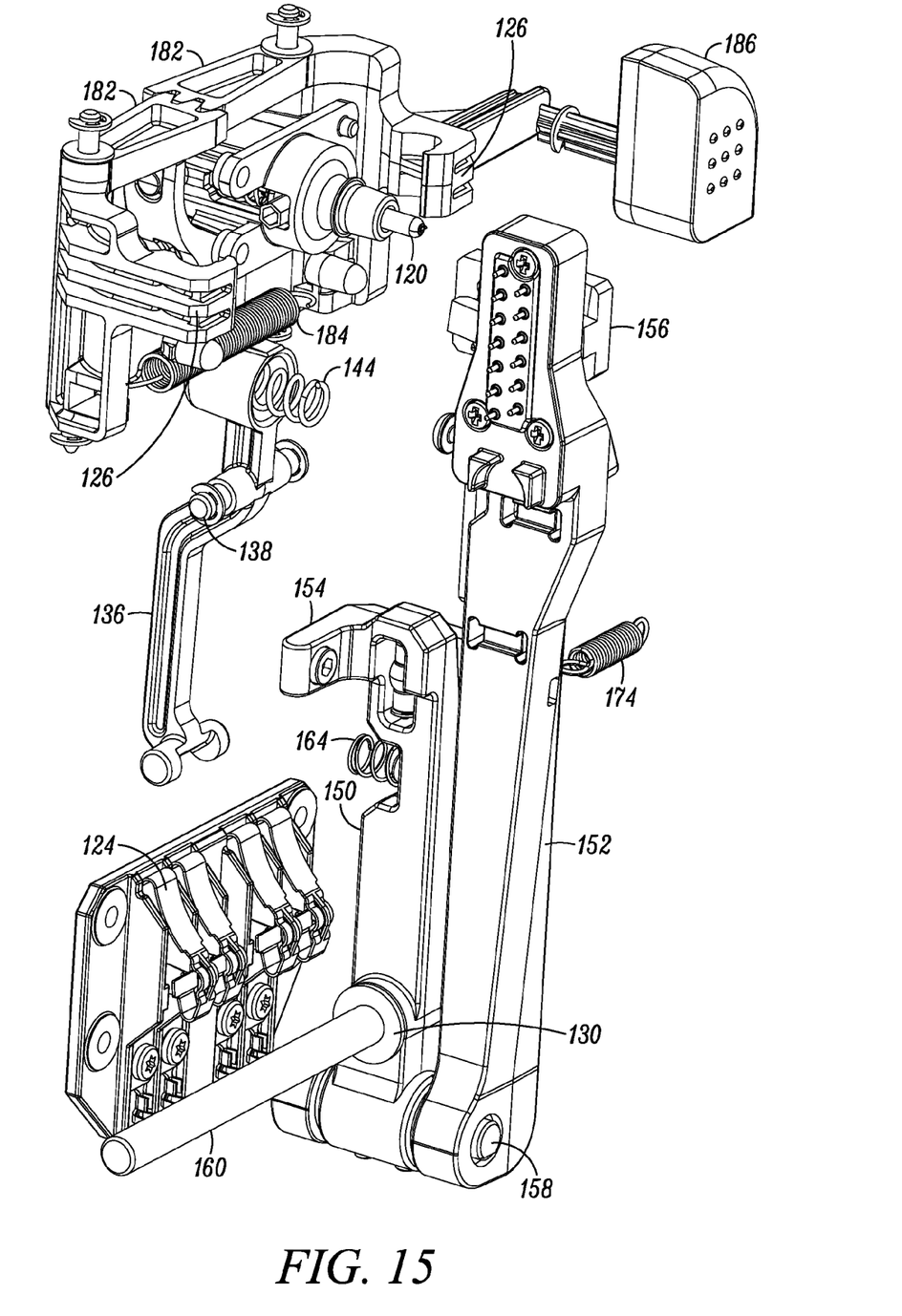
FIG. 15 is view of the interconnect components making up the vehicular adapter in accordance with an embodiment of the invention.

When the radio is inserted into the rotating pocket 116, and the rotating pocket is pushed forward, the second arm 152 pivotally moves about pivot 158 such that side connector contacts 122 move towards and mate with the radio side contacts 222 as seen in FIG. 13. In order for side connector contacts 122 to mate with the radio side contacts, two arms are used which will be referred to first arm 150 and second arm 152. The first arm 150 is spring-loaded (as seen in FIG. 15) to the front housing portion 104 via first arm spring 164 and has a deflected push plate 154 which is located behind the rotating pocket 116. First arm 150 moves around pivot point 160 through hinge 130. As the rotating pocket 116 is rotated into the recessed area 118, the rotating pocket pushes on deflected push plate 154 thereby causing the first arm 150 to move in the same direction as the rotating pocket 116, about pivot point 160. The second arm 152 is pivotally mounted to the first arm at pivot 158 such that the second arm 152 pivots perpendicularly to the first arm 150 as the rotating pocket is being pushed inward. The second arm 152 moves together with the first arm 150, around pivot point 160. Additionally, second arm 152 is spring loaded via second arm spring 174 and moves around its pivot 158. Pivot 158 itself is assembled to first arm 150 and moves accordingly around pivot point 160. Thus, the first arm 150 and second arm 152 are able to pivot in perpendicular directions to each other. The first arm 150 pivots front to back, in the same line of rotation as the rotating pocket, while second arm 152 pivots side to side. Accordingly, as the first arm 150 moves inward, second arm 152 rotates towards and mates with side connector 222 of the portable radio 200.

Additionally, as seen in FIG. 12, cam 156 is coupled to a top side of second arm 152 to provide trajectory movement to second arm 152. While the desired movement may be achieved without the use of the cam 156, the cam provides additional precision of movement.

Locking Mechanism.

Figure 14:
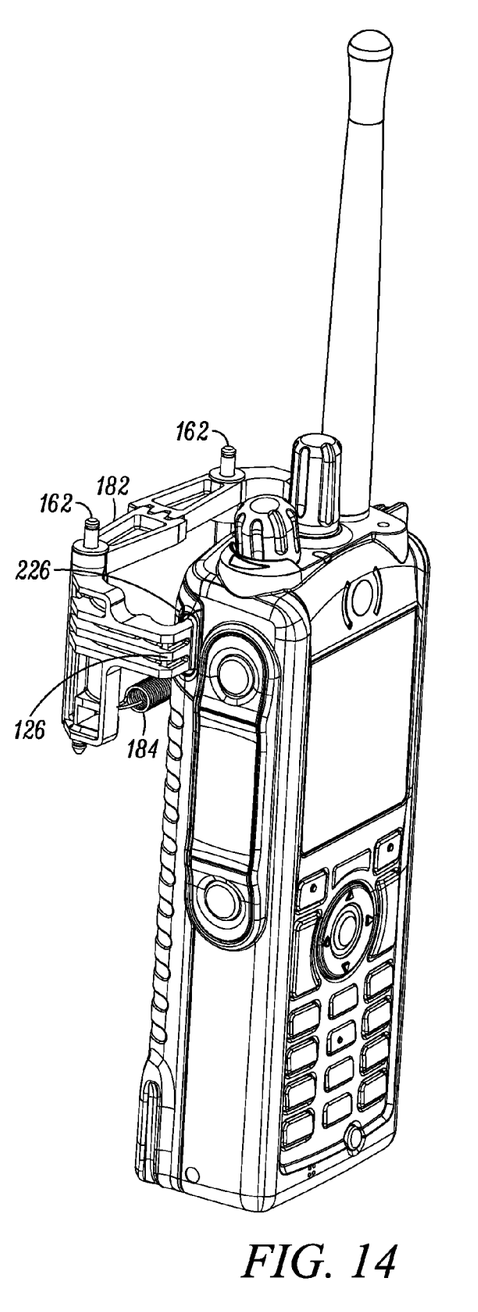
FIG. 14 is a more detailed view of the locking mechanism in accordance with an embodiment of the invention.

FIG. 14 shows the locking mechanism of the vehicular adapter 100 in accordance with an embodiment of the invention. The locking mechanism comprises first and second latches 126 extending outside of the front housing portion 104 within recessed area 118. The first and second latches are used to captivate the first and second side slots 226 of the portable radio 200.

The latches 126 are pivotally coupled via locking arm pivots 162 to two locking arms 182 which are mounted within the front housing portion 104. The locking arms 182 ratchet in response to the latches 226 being pushed by the portable radio 200 upon insertion of the radio into the recessed area 118. A release button 186 (not shown in this view) disengages the locking arms to release the latches 126 so that the radio can be removed from the rotating pocket 116.

The locking arms 182 are spring loaded via locking arm spring 184. Locking arm spring 184 is located between the locking arms 182 to pull the arms around pivots 162. The locking arm spring 184 is responsible for maintaining the latches 126 in a closed or latched position, meaning that the latches 126 are moved towards each other and moved into the radio slots 226. The latches 126 open in response to the portable radio 200 being pushed into the recessed area 118 (cradle) The top half of the portable radio 200 pushes the latches 126 outward and upon the radio reaching its final position, radio slots 226 are co-located against latches 126. The spring loading allows the latches 126 to captivate the slots 226.

FIG. 15 is a partially exploded view of the interconnect components making up interconnect and interface components within the vehicular adapter 100 in accordance with an embodiment of the invention. Upon insertion of a radio into the rotating pocket, vehicular adapter power contacts 124 mate with corresponding radio power contacts. In response to the rotating pocket being pushed forward, the rotating pocket rotates about pocket hinge 130 at pivot point 160 (in this view shown as a rod through hinge 130) and locks via side latches 126. In response to the rotating pocket pushing on antenna probe arm 136, antenna probe arm 136 pivots about pivot 138 which moves the antenna probe 120 forward towards the antenna switch of the portable radio. Rotation of the rotating pocket at hinge 130 and pivot point 160 also pushes first arm 150 and plate 154 backward causing second arm 152 to pivot about pivot point 158 towards the side radio contacts. Antenna probe arm spring 144 is coupled to probe arm 136 above the hinge 138. The spring 144 compresses when pocket 116 is rotated toward the recessed area 118 thereby moving the probe "outward." The antenna probe arm spring 144 releases in response to the rotating pocket 116 being rotated out of the recessed area 118 thereby moving probe arm 136 back and the probe inward.

Both the first arm 150 and second arm 152 are spring loaded via springs 164 and 174 respectively. The two arms are spring loaded perpendicular to each other such that as the first arm 150 pivots forward about hinge 130 at pivot point 160 in response to the rotating pocket 116 being pushed while the second arm 152 pivots inward about pivot 158 towards the radio. Cam 156 is in contact with the top side of second arm 152 to provide additional trajectory precision.

Accordingly, there has been provided a vehicular adapter which provides simultaneous coupling of different types of interface contacts on a plurality of different surfaces. The vehicular adapter formed in accordance with the various embodiments permits insertion of a portable radio into the vehicular adapter while engaging connectors from different sides using a single step operation. The user of the vehicular adapter need only insert the radio into the rotating pocket (thereby making power contact) and push the radio/pocket forward into the recessed area. The latches capture the radio while side connector contacts and antenna probe are simultaneously engaged to the portable radio in response to the rotating pocket being rotated/pushed into the recessed area. For removal, the user need only press the release button and pull the radio from the latches. The release of the latches rotates the pocket back to its default position and disengages/retracts the probe and side connector contacts. The plurality of pivot arms operatively coupled to the rotating pocket controls the motion of the side connector contacts and probe contact within the recessed area. Thus, synchronized engagement and disengagement is achieved.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A vehicular adapter, comprising:
a housing having a recessed area;
a rotating pocket pivotally coupled to the housing within the recessed area, the rotating pocket having a plurality of contacts located therein;
a first pivot arm pivotally coupled within the housing, the first pivot arm having a probe contact coupled thereto, the probe contact being pushed into the recessed area in response to the rotating pocket being rotated towards the housing;
a second pivot arm pivotally coupled within the housing and pivoting in response to the rotating pocket being pushed towards the housing, the second pivot arm pivoting in the same direction as the rotating pocket;
a third pivot arm having side connector contacts, the third pivot arm pivotally coupled within the housing so as to pivot perpendicularly to the second pivot arm in response to the second pivot arm being rotated as the rotating pocket is being pushed towards the housing and the side connector contacts emerging into the recessed area in response thereto; and
spring loaded latches for extending into the recessed area.

2. The vehicular adapter of claim 1, wherein the plurality of contacts of the rotating radio comprise are cantilever contacts.

3. The vehicular adapter of claim 1, wherein the side connector contacts comprising a plurality of spring contacts.

4. The vehicular adapter of claim 1, wherein the probe contact comprises an antenna probe contact.

5. The vehicular adapter of claim 1, further comprising a release button for releasing the spring loaded latches.

6. The vehicular adapter of claim 1, wherein the plurality of contacts within the rotating pocket, the side connector contacts, and the probe contact mates with corresponding contacts of a portable radio in response to the portable radio being inserted into the rotating pocket of the vehicular adapter and the rotating pocket being pushed into the recessed area of the housing.

7. A vehicular adapter for a portable radio, the vehicular adapter comprising:
a housing;
a rotating pocket coupled to the housing for receiving the portable radio, the rotating pocket having power contacts for mating with corresponding radio power contacts of the portable radio;
an antenna probe arm having a pivoting portion located within the housing and an antenna probe extending out of the housing, the antenna probe arm pivoting in response to the rotating pocket being rotated, the antenna probe arm engaging and disengaging the antenna probe to a recessed antenna contact of the portable radio;
a first arm pivotally coupled within the housing for pivoting in the same direction as the rotating pocket in response to the rotating pocket being rotated;
a second arm pivotally coupled within the housing, the second arm pivoting in a perpendicular direction to the first arm in response to the rotating pocket being rotated, the second arm having connector side contacts for mating with corresponding radio side contacts of the portable radio when the rotating pocket is rotated; and
first and second latches for captivating the portable radio when the rotating pocket with radio inserted therein are rotated toward the housing.

8. The vehicular adapter of claim 7, wherein the antenna probe is spring loaded.

9. The vehicular adapter of claim 7, wherein the first and second latches are coupled to first and second locking arms which engage and disengage the first and second latches in response to the portable radio being inserted within the rotating pocket and the rotating pocket and portable radio being rotated into the housing.

10. The vehicular adapter of claim 7, wherein rotation of the rotating pocket with portable radio inserted therein causes the first arm to move backwards and the second arm to move towards the portable radio in conjunction with the antenna probe engaging with the recessed antenna contact.

11. The vehicular adapter of claim 7, wherein the rotating pocket comprises power contacts for mating with corresponding contacts of the portable radio.

12. A communication system, comprising:
a portable radio having a recessed antenna switch, side radio contacts and power contacts, located on different surfaces of the portable radio;
a vehicular adapter for receiving the portable radio, the vehicular adapter providing an interface for mating with the portable radio recessed antenna switch, side radio contacts and power contacts located on different surfaces, the vehicular adapter comprising:
a housing having a recessed area formed within a front surface;
a rotating pocket coupled to the front surface within the recessed area of the housing for receiving the portable radio, the rotating pocket comprising contacts for mating with corresponding contacts of the portable radio;
a back pivot arm pivotally coupled within the housing, the back pivot arm having an antenna probe coupled thereto, the back pivot arm pivoting in response to the rotating pocket being rotated towards the front surface of the housing to engage the antenna probe to the recessed antenna switch of the portable radio;
a first arm pivotally coupled to the housing and pivoting in the same direction as the rotating pocket as the rotating pocket is pushed into the recessed area;
a second arm pivotally coupled within the housing, the second arm pivoting in a direction perpendicular to the first arm in response to the first arm being pivoted, the second arm having connector side contacts for mating with the side radio contacts; and
a locking mechanism coupled to the housing for captivating the portable radio once the rotating pocket has been rotated against the front surface of the housing into the recessed area.

13. The vehicular adapter of claim 12, wherein the portable radio further comprises a cover for the recessed antenna switch.

14. The vehicular adapter of claim 12, wherein the locking mechanism comprises:
   first and second locking arms located within the housing; and
   first and second latches extending outside of the housing coupled to the first and second locking arms, the first and second latches captivating the portable radio in response to the rotating pocket and portable radio being rotated against the front surface of the housing.

15. The vehicular adapter of claim 14, wherein the first and second latches are spring loaded latches.

16. A vehicular adapter for a portable radio, comprising:
   a vehicular adapter housing having a recessed area;
   a rotating pocket pivotally coupled to the recessed area, the rotating pocket having a plurality of contacts located therein for mating with corresponding contacts of the portable radio upon insertion of the portable radio into the rotating pocket;
   side connector contacts which project through and retract within an opening within the recessed area, the side connector contacts for mating with corresponding side contacts of the portable radio; and
   a probe contact located in the recessed area for mating with a recessed contact of the portable radio.

17. The vehicular adapter for a portable radio of claim 16, further comprising latches extending into the recessed area for captivating the portable radio.

18. The vehicular adapter for a portable radio of claim 16, further comprising a plurality of pivot arms within the vehicular adapter housing, the plurality of pivot arms operatively coupled to the rotating pocket to provide pivoting motion to the side connector contacts and probe contact within the recessed area.

* * * * *